United States Patent
Thomsen et al.

[11] Patent Number: 6,007,331
[45] Date of Patent: Dec. 28, 1999

[54] REMOVAL OF SULFUR OXIDES FROM PREHEATER OFF GASES

[75] Inventors: Kent Thomsen, Valby, Denmark; Flemming Schomburg, Bethlehem, Pa.

[73] Assignee: Fuller Company, Bethlehem, Pa.

[21] Appl. No.: 09/240,909

[22] Filed: Jan. 29, 1999

Related U.S. Application Data

[62] Division of application No. 09/025,957, Feb. 19, 1998.
[51] Int. Cl.$^6$ ....................................................... F27B 7/02
[52] U.S. Cl. ........................ 432/58; 432/106; 423/244.01
[58] Field of Search ................................ 432/16, 58, 106; 423/244.01, 244.07

[56] References Cited

U.S. PATENT DOCUMENTS

| | | | |
|---|---|---|---|
| 4,469,664 | 9/1984 | Abelitis et al. | 432/14 |
| 4,715,811 | 12/1987 | Lawall | 432/58 |
| 5,698,027 | 12/1997 | Borgholm et al. | 432/106 |
| 5,882,190 | 3/1999 | Doumet | 432/106 |

*Primary Examiner*—John A. Jeffery
*Assistant Examiner*—Gregory A. Wilson
*Attorney, Agent, or Firm*—Daniel De Joseph

[57] ABSTRACT

Sulfur oxides are removed from a preheater waste gas stream by reacting the sulfur oxides with lime recovered from the off gas stream in a calcining furnace. The method is particularly adaptable for use in a cement manufacturing plant wherein the sulfur dioxides in the waste gases result from the combustion of fossil fuels used for process heat.

11 Claims, 2 Drawing Sheets

REMOVAL OF SULFUR OXIDES FROM PREHEATER OFF GASES

This is a division of application Ser. No. 09/025,957 filed Feb. 19, 1998.

BACKGROUND OF THE INVENTION

1. Field of the Invention

This invention relates to methods of treating preheater waste gases to remove sulfur oxide emissions and more particularly to removing sulfur oxides from preheater waste gases by inserting CaO, which is present as fines entrained in the off gas from the calcining furnace, into an upper stage of a multi-stage preheater to react with and reduce sulfur oxides, and in particular the SO2, present in the preheater off gases.

2. Brief Description of the Prior Art

Sulfur oxides are contaminants in waste gases from cement manufacturing processes. They are partly produced by the combustion of fuels which are the source of process heat. The primary source of sulfur oxides in the waste gas stream are from the volatilization of certain components in the cement raw meal, and in particular the pyrites present in the cement raw meal, which typically occurs in the preheating stage. Because sulfur oxides contribute to air pollution, their emission is being regulated in an increasingly stringent manner.

Because of the importance of removing sulfur oxides from industrial waste gases, a variety of techniques have been developed to treat such waste gases to reduce or eliminate the emission of sulfur oxides.

U.S. Pat. No. 4,102,982, to Weir, discloses a process for removing pollutants such as sulfur dioxide from stack gases by passing the waste gases through a defined flow path into which at least one selected liquid reagent is introduced. For removing acidic pollutants such as sulfur dioxide a scrubbing solution containing lime may be used. Weir discloses that the use of limestone in conventional wet scrubbers for removing sulfur dioxide from waste gases has resulted in a lower efficiency of removal.

U.S. Pat. No. 4,576,803, to Hegemann et al., discloses scrubbing flue gases with scrubbing solutions containing lime which may include calcium carbonate as well. However, Hegemann does not disclose maintaining a high efficiency in scrubbing flue gases with scrubbing solutions containing limestone.

U.S. Pat. No. 5,512,097, to Emmer, teaches a method of removing sulfur oxides from a waste gas stream, by passing it through a reverse jet scrubber in which a suspension of finely divided limestone slurry is used as an absorption medium. The limestone is taken from the material comminuted for the cement manufacturing step.

It would be advantageous to remove harmful sulfur oxides from waste gas emissions without having to utilize acqueous scrubbers or an extensive amount of scrubbing equipment.

Accordingly, a need has continued to exist for a simple method of removing sulfur oxides from a waste gas stream.

An object, therefore, of the present invention is to provide an efficient process for removing sulfur oxides from the emission stream of a cement manufacturing process utilizing a non-aqueous sulfur oxide removal agent.

Another object is to remove sulfur oxides from the waste gas stream of a cement manufacturing process using a byproduct from the process via a method that does not require the utilization of an extensive amount of additional equipment.

Other objects of the invention will become apparent from the description of the invention which follows.

In general, the foregoing and other objects will be carried out by providing a process of manufacturing cement having low sulfur emissions from cement raw meal in an apparatus including a hot or cold combustion air source, such as a clinkering furnace or a clinker cooler, and a source of CaO as producing during a calcination step in the process. In one preferred embodiment, the apparatus will consist of a clinkering furnace, preferably a separate calcining furnace, and a vertically positioned multi-stage preheater, or a preheater having multi-stage strings.

The clinkering furnace will have a feed end and a clinker discharge end and means for supplying fuel to the discharge end to establish a burning zone in the clinkering furnace. There is a riser duct at the feed end of the clinkering furnace for discharging combustion gas produced in the burning zone to the calcining furnace.

Likewise, the calcining furnace has a duct to discharge off gases containing CaO fines to the preheater. Also present is means to remove a portion of such off gases from the calcining furnace and to direct said portion to a separator means for separating CaO fines from the off gases and means to direct the separated CaO fines to an upper stage preheater (i.e., typically the first or second stages in a four stage preheater or the first three stages in a five stage preheater, wherein the "first" stage is that stage where material to be heat treated first enters the preheater, the "second" stage is the next stage through which material passes, and so on sequentially through the preheater) of the multi stage preheater wherein there is a reaction between the CaO fines and SO2 gases to form calcium sulfites, which are separated from the preheater gases and are eventually incorporated in the cement clinker.

The calcining furnace will have an inlet for preheated cement raw meal to be calcined, an inlet for fuel, an inlet for air for combustion and an outlet for spent combustion air and calcined cement raw meal.

Typically, there will be a gas solids separator flow connected to the calcining furnace having (i) an inlet for spent combustion air, having entrained therein calcined cement raw meal fines, flow connected to the outlet of the calcining furnace; (ii) an outlet for separated gas connected to the gas inlet of the lowest stage preheater, and (iii) an outlet for separated calcined cement raw meal flow connected to the feed end of the clinkering furnace. As indicated, there is also a riser duct which flow connects the feed end of the clinkering furnace to the inlet for air for combustion of the calcining furnace for discharging combustion gas from the clinkering furnace to the calcining furnace.

A clinker cooler may be incorporated in the apparatus and will have an inlet for clinkered cement, an inlet or inlets for cooling air, an outlet for cooling air and an outlet for the cooled clinker. The outlet for cooling air may be flow connected to the inlet for air of either the clinkering furnace, the calcining furnace and/or the multi-stage preheater.

BRIEF DESCRIPTION OF THE DRAWING

The invention will be described in connection with the annexed drawing wherein.

DESCRIPTION OF THE PREFERRED EMBODIMENTS

Figure 1:
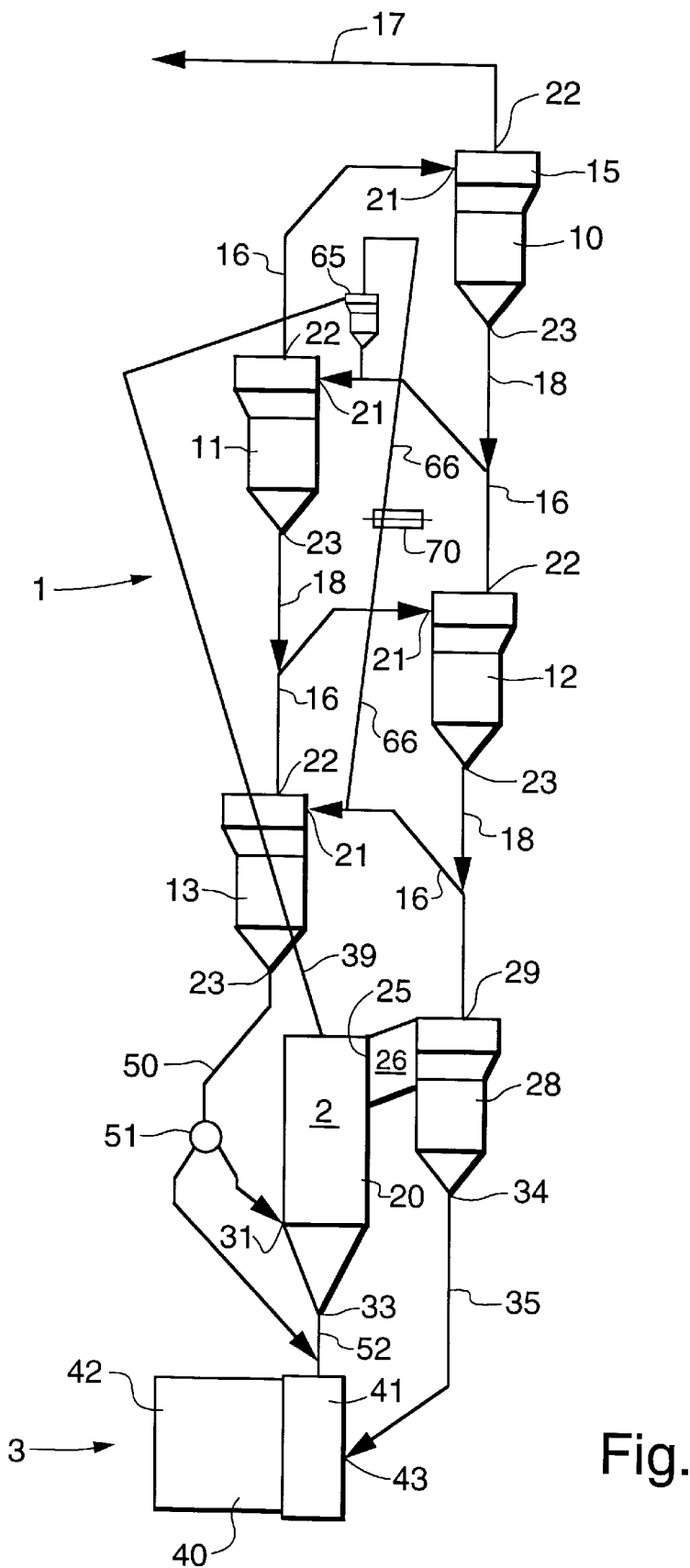
FIG. 1 is a schematic view, not drawn to scale, of the apparatus according to the present invention.

Referring to FIG. 1, the apparatus for carrying out the process of the present invention is illustrated. This apparatus includes a vertically situated, multi-stage suspension type preheater generally indicated at 1, a calcining furnace generally indicated at 2 and a combustion air source, which as depicted may be a clinkering furnace, which in the preferred embodiment is a rotary kiln, generally indicated at 3. A clinker cooler and a high efficiency dust collection system is generally also included in a complete system, but are not depicted in FIG. 1. Each of the components of the apparatus is conventional and will not be described in detail.

The multi-stage preheater 1, in the preferred embodiment, includes a plurality of serially connected cyclone type gas solid separators 10–13, each having an inlet 21 for gas and entrained cement raw meal, an outlet 22 for separated gas, and an outlet 23 for separated solids. It is understood that a multi-stage preheater having more or less stages than is depicted can be utilized in the present invention. The multi-stage preheater 1 is referred to as being preferably vertically situated in that every stage going away from the calciner 2 is located at a higher level than the immediately preceding stage, with the uppermost stage 10 being the stage that is located furthest from calciner 2 and also being the stage from which the preheating air finally exits the preheater. Other arrangements of multi-stage preheaters are also encompassed by the present invention.

The preheater includes an inlet 15 for cement raw meal. A conduit 16 flow connects the outlet 22 of one separator to the inlet 21 of the adjacent separator. In a conventional manner, as material is discharged from one separator through material outlet 23 it is supplied via duct 18 to conduit 16 where the material is entrained and conveyed to the next lower adjacent cyclone, that is, from cyclone 10 to cyclone 11 to cyclone 12 to cyclone 13. During the alternate entrainment/separation process, the raw meal is heated by the hot gases supplied to preheater 1 from calcining furnace 2. The gases will flow through preheater 1 in countercurrent relation to the flow of the preheated cement raw meal, i.e., the gases will flow to the next upper adjacent cyclone, that is, from cyclone 13 to cyclone 12 to cyclone 11 to cyclone 10. Spent preheating gases discharged from the uppermost cyclone 10 are discharged via conduit 17 from the system through a high efficiency dust collector (not shown) in a known manner.

The calcining furnace 2 may be conventional and well known in the art. The calciner includes a vessel 20 having an inlet 31 for preheated cement raw meal flow connected to the outlet 23 of the last cyclone 13 in the series of cyclones 10–13 for receiving preheated cement raw meal. The calciner also includes burners (not shown) and an inlet 33 for receiving air for combustion. Calciner 2 also includes an outlet 25 for spent combustion gas and entrained and calcined cement raw meal. The outlet 25 is connected by means of a duct 26 to a gas solids separator 28 of the cyclone type. The separator 28 includes an outlet 29 for hot spent combustion gas which is conveyed through duct 16 for supplying hot gas to lower stage preheater 13 in a conventional manner. The cyclone 28 also includes an outlet 34 for supplying material through a duct 35 to the feed inlet 43 of kiln 40 through conduit 35. Combustion gases are provided to calcining furnace 2 from clinkering furnace 3 via riser duct 52.

In a less preferred embodiment, both the calcination and clinkering stage can take place in a single unit. Such a unit would still utilize a riser duct to supply combustion air to preheater 1.

The clinkering furnace 3 is preferably a rotary kiln 40 having a feed end 41 and a discharge end 42 with a burning zone in the discharge end. Fuel is supplied to kiln burner (not shown) for generating a burning zone in the lower or discharge end of the kiln and maintaining temperatures sufficient to clinker the already calcined cement raw meal, which enters kiln 40 via inlet 43, in a conventional manner. Oxidizing conditions are maintained in the burning zone for optimum clinker production and to control fuel usage.

In a clinker cooler means (not shown in FIG. 1) flow connected to the discharge end of a kiln cooling air is heated as it passes over and through the cement clinker. A portion of the cooling air is returned to the kiln 40 as preheated secondary air for combustion.

Also according to the present invention a portion of the off gases from calciner 2 containing entrained calcium oxide fines produced during the calcination process is diverted via conduit 39 to separator means 65, whereupon the calcium oxide fines are separated from the off gases. The separated calcium oxide containing fines are inserted into an upper stage preheater, in this case separator 11, in which it reacts with evaporated $SO_2$ from the gas stream to form calcium sulfites, which are separated from the gas stream and directed via conduit 66 to downstream preheater 13 or a higher stage preheater.

The CaO fines are preferably directed to the particular upper level preheater exposed to the temperature range wherein $SO_2$ gases are first evaporated from the cement raw meal. Typically, this will be the second stage preheater, when the uppermost preheater is designated as the first stage preheater and so on down the preheater unit.

The CaO fines are preferably separated from the off gas stream and separately, i.e. apart from the entraining gas, inserted in the upper stage of the preheater because it has been discovered that inserting the CaO containing off gas stream in an upper stage preheater may result in an undesirable amount of increase of the temperature of the preheater exit gas. Therefore, in the preferred embodiment of the invention the separated gas stream will be directed via conduit 66 to a lower stage preheater, which in the depicted embodiment is fourth stage preheater 13, than the preheater stage into which the CaO fines are inserted to thereby diminish the cumulative temperature increase in the exit gas from the preheater. Typically, the separated off gas from separator 65 will be inserted into as low a preheater stage as possible in order to keep the preheater exit gas temperature increase at a minimum. However, care must be taken to insure that there is sufficient suction in the system to draw the now increased air from such a lower level preheater stage. In the four stage preheater system as depicted, there typically will not be so great a pressure differential to prevent the pull off of the gas from fourth stage preheater 13 and out of the preheater tower.

In a less preferred embodiment the CaO fines-containing gas taken off of the calciner can be directly inserted in an upper level stage of a multi-stage preheater without having been subject to a fines separation process.

It is understood that when reference is made to "inserting", or "delivering" (or similar terms) separated CaO fines and/or separated gas "into" a particular preheater stage, such language is meant to also denote that the CaO fines or gases may be inserted both directly into the preheater stage or into the off gas conduit 16 leading into the particular preheater stage.

Means are provided to adjust the amount of CaO-containing off gas pulled from calciner 2, and to thereby vary the amount of CaO utilized to react with $SO_2$. As both the amount of $SO_2$ in the exit gases and the amount of CaO fines present in a given quantity of gases can be calculated, the amount of off gases drawn from calciner 2 can be adjusted to provide that a stoichiometric amount of CaO is withdrawn from the system for use in the present process. In the depicted system the gas adjusting means is valve 70.

Preheated solids are passed from the lowest stage of the preheater, which as depicted in FIG. 1 is cyclone 13, via conduit 50 to material inlet 31 of calciner 2. Conduit 50 may include splitter means 51 in which the flow of preheated solids may be split between inlet 31 and riser duct 52 of kiln 3. It may be desirable to direct preheated material into riser duct 52 for a number of reasons, including using such material to clean out the riser duct and/or reduce the temperature in the riser duct. Typically, only an amount of preheated raw cement meal that will be completely entrained in the combustion air exiting clinkering furnace 3 will be directed into riser duct 52.

Figure 2:
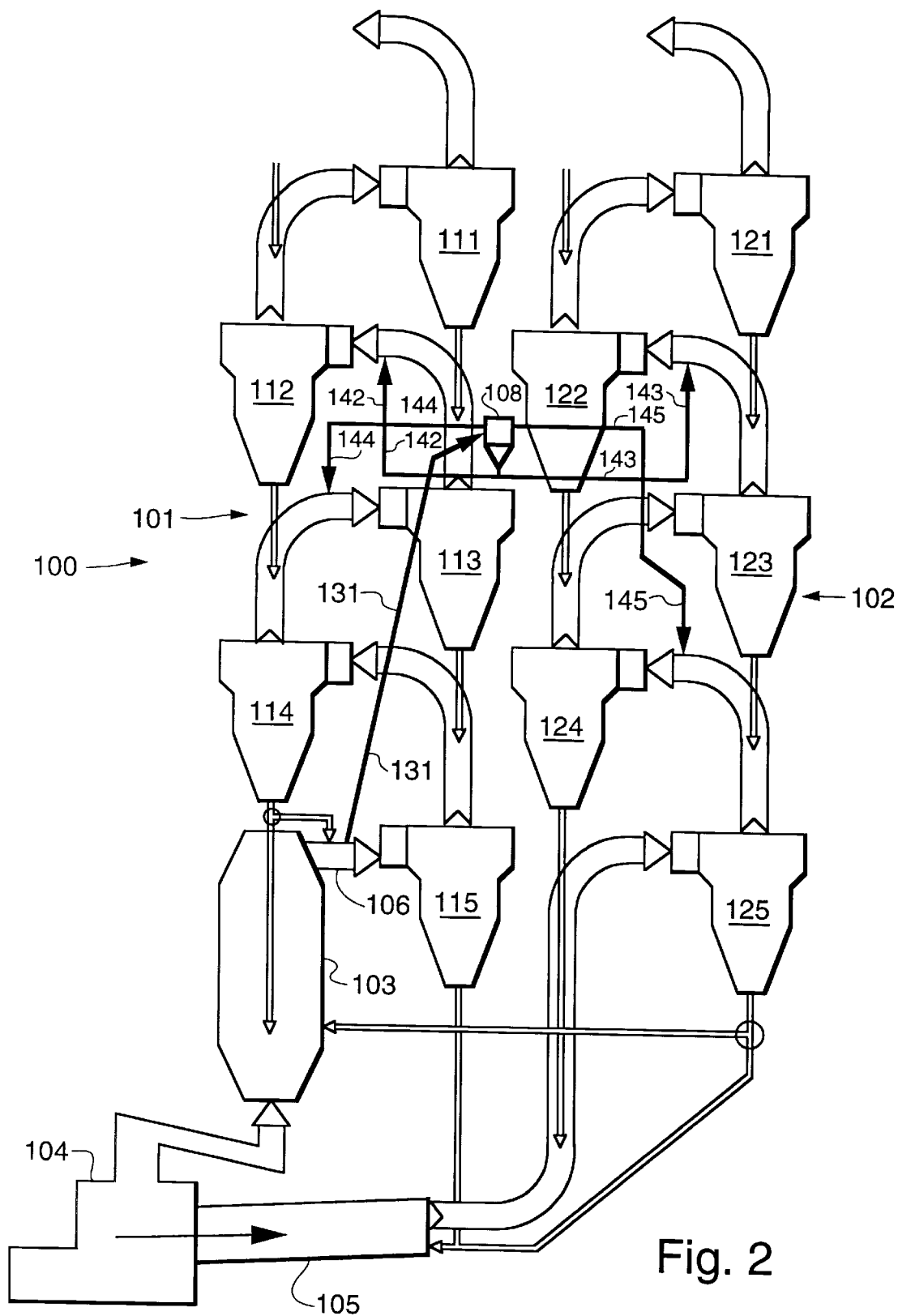
FIG. 2 is a schematic view, not drawn to scale, of another embodiment of an apparatus according to the present invention in which there is utilized a multi-string preheater.

FIG. 2 illustrates another embodiment of the present invention in which parallel multi-strings 101 and 102 of multi-stage preheater 100 are employed. As shown, combustion air for calciner 103 is provided by clinker cooler 104.

String 101 is comprised of preheater stages 111–115 and particulate material inlet 116 while string 102 is comprised of stages 121–125 and particulate material inlet 126. Rotary kiln 105 provides preheating air for string 102.

Combustion gas containing entrained CaO fines is drawn off outlet duct 106 and is directed via duct 131 to separation means 108, in which the CaO fines are separated from the entraining gases.

The movement of the gases and solids through strings 101 and 102 and the means for removing S02 emissions are essentially the same as described for the system set forth in FIG. 1. For example, the fines from separation means 108 are split and directed into 2nd stage separators 112 and 122, via conduits 142 and 143, respectively, while the gases are directed into lower stage preheaters, such as stages 113 and 124, via conduits 144 and 145, respectively.

The present invention as illustrated in the Figures can be a complete new system or the invention may also be utilized by modifying an existing suspension preheater/flash calciner system for manufacturing cement clinker or heat treating other particular material in the production of which CaO fines are a byproduct and SO2 is given off in the gaseous emissions.

It should be apparent that the objects of the present invention have been carried out.

The invention having now been fully described, it should be understood that it may be embodied in other specific forms or variations without departing form its spirit or essential characteristics. Accordingly, the embodiments described above are to be considered in all respects as illustrative and not restrictive, the scope of the invention being indicated by the appended claims rather than the foregoing description, and all changes which come within the meaning and range of equivalency of the claims are intended to be embraced therein.

We claim:

1. An apparatus for producing cement clinker comprising:
    a source of combustion air;
    a calcining furnace having an inlet for preheated cement raw meal to be calcined, an inlet for air for combustion flow connected to the source of combustion air and an outlet for spent combustion air and calcined cement raw meal;
    a multi-stage preheater for cement raw meal, with each stage of the preheater having an inlet and an outlet for cement raw meal and an inlet and an outlet for preheating air, with the stages of the preheater being serially connected and vertically arranged from the lowest to the highest stage;
    means to direct a first portion of the spent combustion air, which contains CaO fines entrained therein, to the inlet for preheating air of the lowest stage of the multi-stage preheater;
    separator means for separating out CaO fines from the spent combustion air;
    means to divert a second portion of the spent combustion air from the calcining furnace to the separator means;
    means to direct the separated CaO fines from the separator means to an upper level stage of the preheater; and
    means to direct the spent combustion air, from which the CaO fines have been separated, from the separator means to a lower level stage of the preheater.

2. The apparatus of claim 1 wherein the preheater comprises a plurality of serially connected cyclone type gas solid separators.

3. The apparatus of claim 2 wherein the preheater comprises a plurality of parallel strings of serially connected cyclone type gas solid separators.

4. The apparatus of claim 1 wherein the source of combustion air is a clinkering furnace having a feed end and a discharge end.

5. The apparatus of claim 4 wherein the clinkering furnace is a rotary kiln.

6. The apparatus of claim 4 further comprising means to direct calcined cement raw meal from the calcining furnace to the feed end of the clinkering furnace.

7. The apparatus of claim 6 wherein the means to direct calcined cement raw meal from the calcining furnace to the feed end of the clinkering furnace and the means to direct a portion of the spent combustion air to the inlet for preheating air of the lowest stage of the multi-stage preheater comprises a gas solids separator having an inlet for spent combustion air having entrained therein calcined cement raw meal; an outlet for separated gas that is flow connected to said inlet for preheating air and an outlet for calcined cement raw meal that is flow connected to the feed end of the clinkering furnace.

8. An apparatus for heat treating particulate material comprising:
    a source of combustion air;
    a calcining furnace having an inlet for preheated particulate material, an inlet for air for combustion and an outlet for spend combustion air and calcined particulate material;
    means to flow connect the source of combustion air to the inlet for combustion air of the calcining furnace for discharging combustion air into the clinkering furnace;
    a multi-stage preheater for particulate material, with each stage of the preheater having an inlet and an outlet for uncalcined particulate material and an inlet and an outlet for preheating air, with the stages of the preheater being serially connected and vertically arranged from the lowest to the highest stage;
    means to direct a first portion of the spent combustion air, which contains CaO fines entrained therein, from the calcining furnace to the inlet for preheating air of the lowest stage of the multi-stage preheater; and
    means to divert a second portion of the spent combustion air which contains CaO fines entrained therein from the calcining furnace to an upper level stage of the preheater wherein the CaO fines will react with SO2 gases.

9. The apparatus of claim 8 further comprising:

separator means for separating out CaO fines from the spent combustion air;

means to divert a portion of the spent combustion air from the calcining furnace to the separator means;

means to direct the separated CaO fines from the separator means to an upper level stage of the preheater; and means to direct the spent combustion air, from which the CaO fines have been separated, from the separator means to a lower level stage of the preheater.

10. The apparatus of claim 9 wherein the preheater comprises a plurality of serially connected cyclone type gas solid separators.

11. The apparatus of claim 10 wherein the preheater comprises a plurality of parallel strings of serially connected cyclone type gas solid separators.

* * * * *